(12) United States Patent
Kunikyo et al.

(10) Patent No.: US 6,226,268 B1
(45) Date of Patent: May 1, 2001

(54) COMMUNICATION SYSTEM

(75) Inventors: Tomoo Kunikyo, Tokyo; Keiichi Obara, Hachioji; Kazuo Nogami; Tamiya Ochiai, both of Sagamihara, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/952,088

(22) PCT Filed: May 13, 1996

(86) PCT No.: PCT/JP96/01255

§ 371 Date: Nov. 10, 1997

§ 102(e) Date: Nov. 10, 1997

(87) PCT Pub. No.: WO96/36149

PCT Pub. Date: Nov. 14, 1996

(30) Foreign Application Priority Data

May 12, 1995 (JP) ...................................... 7114675

(51) Int. Cl.[7] .............................. H04L 12/40; H04L 12/56
(52) U.S. Cl. ......................... 370/244; 370/395; 370/440
(58) Field of Search .................................. 370/440, 396, 370/397, 400, 231, 250, 235, 242, 244, 245, 395

(56) References Cited

U.S. PATENT DOCUMENTS 4,370,744 * 1/1983 Hirano et al. ........................... 370/88
5,173,898 * 12/1992 Heinzmann et al. ................. 370/94.1

(List continued on next page.)

FOREIGN PATENT DOCUMENTS 596651  10/1994  (EP) .
60-65640  4/1985  (JP) .

(List continued on next page.)

OTHER PUBLICATIONS

NTT R&D vol. 38, No. 10, "EINS330 High–Speed Integrated Optical Loop Network," Kayano, et al., 1989.

IEICE Technical Research Report SSE91–122 (pp. 55–60); "400 Mbit/s Multimedia Backbone LAN," Kunikyo, et al., Dec. 18, 1991.

IEICE Technical Research Report SSE90–109 (pp. 19–24); "Interfaces for Multimedia Optical Loop LAN," Yamazaki, et al., Mar. 13, 1989.

IEICE Technical Research Report SSE88–195 (pp. 37–42); "A Study on Architecture of an ATM Switching System," Yamazaki, et al., Mar. 13, 1989.

IEICE Technical Research Report CS88–36 (pp. 1–6); "Experimental Broadband Subscriber Loop Network "Optical Shuttle Bus"," Taniguchi et al., Jul. 22, 1988.

Proc. ICC 1986, 749–754 (Jun. 22–25, 1986); "Very High Speed and High Capacity Packet Switching for Broadband ISDN," Suzuki, et al., 1986.

*Primary Examiner*—Alpus H. Hsu
*Assistant Examiner*—Duc Ho
(74) *Attorney, Agent, or Firm*—Finnegan, Henderson, Farabow, Garrett & Dunner, L.L.P.

(57) ABSTRACT

An information communication system in which a switch constituting section (2) housing a data generating source is connected to a center switch constituting section (1) through a communication channel (3) using an ATM technology as if the function of an ATM switch of distributed arrangement type was realized. This information communication system flexibly handles new kinds of information provided with the progress of times, and, even when a fault occurs, properly copes with the fault.

9 Claims, 13 Drawing Sheets

U.S. PATENT DOCUMENTS

| | | | |
|---|---|---|---|
| 5,282,198 | * | 1/1994 | Punj ..................................... 370/85.9 |
| 5,339,317 | * | 8/1994 | Tanaka et al. ..................... 370/85.15 |
| 5,406,559 | | 4/1995 | Edem et al. ........................... 370/91 |
| 5,436,891 | * | 7/1995 | Grossman et al. ..................... 370/60 |
| 5,446,738 | * | 8/1995 | Kim et al. ........................... 370/94.2 |
| 5,604,729 | * | 2/1997 | Aoki et al. ........................... 370/224 |
| 5,867,481 | * | 2/1999 | Miyagi ................................. 370/244 |

FOREIGN PATENT DOCUMENTS

| | | |
|---|---|---|
| 60-65641 | 4/1985 | (JP) . |
| 61-264952 * | 11/1986 | (JP) . |
| 62-185433 | 8/1987 | (JP) . |
| 63-98244 | 4/1988 | (JP) . |
| 63-107250 | 5/1988 | (JP) . |
| 63-316541 | 12/1988 | (JP) . |
| 2-150139 | 6/1990 | (JP) . |
| 4-84535 | 3/1992 | (JP) . |
| 5-102980 | 4/1993 | (JP) . |
| 5-83280 | 4/1993 | (JP) . |
| 5-227185 | 9/1993 | (JP) . |
| 5-284156 | 10/1993 | (JP) . |
| 6-216923 | 8/1994 | (JP) . |
| 6-303247 | 10/1994 | (JP) . |
| 7-20121 | 3/1995 | (JP) . |
| 7-74767 | 3/1995 | (JP) . |
| 7-307753 * | 11/1995 | (JP) . |
| WO 91/12677 | 8/1991 | (WO) . |

* cited by examiner

COMMUNICATION SYSTEM

TECHNICAL FIELD

The present invention relates to a communication system constituted by a data processing center, data generating sources and data receiving devices and communication network linking these, in the case where the data generating sources or data receiving devices are arranged in linear fashion.

BACKGROUND ART

The present invention relates to a communication device employed in a communication system whereby a data processing center and data generating source are linked, in the case where data generating sources are arranged linearly; typical examples of such a communication system in which data generating sources are arranged linearly include a road management system, railway management system, sewer management system, airfield management system, river management system, or underground railway management system.

In a road management system, a management center is provided within the management zone and video cameras and/or vehicle sensors etc. are disposed along the roads in the management zone, the information from these being collected at the management center. Also, electro-optic display panels are disposed along the roads. Information concerning accidents and/or congestion from adjacent management zones is collected at the management center and evaluation of various types is performed using these items of information and the information of the management zone in question; as a result, various kinds of guidance including congestion information etc. are displayed on electro-optic notice boards, thereby performing traffic management.

Taking the example of such a road management system, conventionally, information was collected by connecting an information generating source and the center by a one-to-one communication line, and guidance was displayed on the electro-optic notice board.

Such a method suffered from the problem of lack of flexibility owing to the following.

For example, if it was desired to add a new camera in a road management zone, construction work had to be undertaken to lay the communication line to the management center from the point where the addition was made. The same problem arose if it was desired to move a camera.

Roads constitute infrastructure that is used for a long period. New and superior monitoring devices make their appearance from time to time. Thus, there is the problem that construction work for laying communication lines arose every time a new type of device was introduced.

Although monitoring is performed by machines insofar as it can be, monitoring by human beings having the five senses may still be necessary. This is the case when slight changes of sound or changes in the atmosphere etc. are to be monitored. These may necessitate patrolling by human beings. In such cases, the monitoring staff have to perform monitoring by patrolling by carrying portable terminals. The monitoring staff need to communicate with the center by their portable terminals from time to time. With the conventional method, preparatory work was necessary to arrange connectors at various locations along the road, these connectors being linked to the center by communication lines. This was not particularly practical.

This information that it was desired to send was of various types, ranging from large amounts of information for which real-time characteristics were required such as video or small quantities of information that did not require real time characteristics, such as monitoring data. It is desirable for these to be integrated and sent by a number of cables if possible.

A further problem with the conventional method was that communication became impossible if there was some fault in the communication device or communication line.

Thus, the conventional system suffered from inflexibility in regard to alterations such as addition or movement of data generating sources or installation of temporary data sources. It also lacked the capability of being able to freely adapt to transmission data of various types such as ITV image data, computer data, or audio data etc. and to send these various types of data in integrated manner. Furthermore, while self-recovery would be desirable in the event of occurrence of a fault, such a function cannot be expected with the conventional system in which data generating sources and the center are connected by cable. Furthermore, from the point of view of infrastructure, there are many problems with the conventional system in that the communication system must be flexibly adapted to alterations over a long period.

An object of the present invention is to realize a communication system wherein the above problems can be solved, which has considerable flexibility, which can cope with data of various types, which can also cope with faults, and which can flexibly cope with future improvements in equipment.

DISCLOSURE OF THE INVENTION

The present invention is characterized by comprising: a plurality of node devices arranged in a distributed fashion in a plurality of locations; one or a plurality of local communication terminals connected to each of the node devices; communication channel means for connecting the plurality of node devices in series; and a center device to which a starting end and a terminal end of the communication channel means are connected; in which the center device sends data for each local communication terminal to the communication means and each of the node devices receives the data and extracts, from this data, data for a local communication terminal connected to the node device in question, and thereby outputs this data to the local communication terminal in question.

The present invention is also characterized by comprising: a plurality of node devices arranged in a distributed fashion in a plurality of locations; one or a plurality of local communication terminals connected to each of the node devices; communication channel means for connecting the plurality of node devices in series; and a center device to which a staring end and a terminal end of the communication channel means are connected; in which the center device sends cell-formed data for each local communication terminal to the communication means and each of the node devices receives the cell-formed data, and extracts, from the received cell-formed data, cell-formed data for a local communication terminal connected to the node device in question, and thereby outputs this cell-formed data to the local communication terminal in question.

Further, each node device may comprise multiplexing transmission means whereby data from the local communication terminal connected to the node device in question are multiplexed with data from the communication channel means downstream and sent to the communication channel means and the center device may collect data from each local communication terminal by receiving data sent to the communication channel from the multiplexing transmission means.

Also, the center device and each node device comprise a transmitter and a receiver, and perform cell transfer with the communication channel means through the transmitter and the receiver.

Further, alteration of logical identifier of the cells is not performed at the node devices.

Also the node devices comprise switch element means wherein cells from the local communication terminal and cells from the upstream center device or node device are mixed without overlapping and are sent to the downstream center device or node devices.

Cell transmission from the node devices to the communication terminal is effected by means of a logical identifier that is permanently allocated to the node device and the communication terminal and is effected by copying the cells at the node device.

When a node device detects a fault by the cessation of transmission of cells from the upstream center device or node device, it transmits a fault cell bearing its own identifying information by a specified virtual communication channel to the downstream center device or node device.

Alternatively, a node device may constantly send with fixed time interval a fault monitoring cell carrying its own identifying information to the downstream center device or node device and, on detecting a fault by the cessation of transmission of the fault monitoring cell from the upstream center device or node device, may send fault location information to the center device.

The communication channel means may be duplicated by provision of two independent circuits so as to recover the communication function on occurrence of a fault by loop-back upstream and downstream of the fault location.

The function of an ATM switch may be constituted by the node devices, the communication channel means and the center device.

With such a configuration according to the present invention, the data generating sources and the center are linked by switches of distributed arrangement type, and connection between the switch-constituting sections is achieved by the ATM technique. By this means, an information communication system can be realized that has great flexibility and can cope with new information as developments take place over time. It is also fully capable of coping with occurrence of faults.

As described above, in the present invention, a communication system is realized by distributed arrangement of switch-constituting sections of an ATM switch. Due to this, the following advantage are obtained.

Firstly, the switch-constituting sections may be dispersed at long distances of several km over a wide range. Consequently, the wiring from the terminals to the switches can be short.

Since information exchange between switch-constituting sections is effected by an internal format, formatting between the switch-constituting sections is unnecessary: this simplifies construction and means that less components need be used and so is economic.

Also, since the VPI/VCI is not replaced when the cells pass through the switch-constituting sections, this also simplifies construction and means that less components need be used and so is economic.

When cells are handed over from a switch-constituting section to a terminal, this is done by copying the cells, so the cells can subsequently flow on the transmission channel enabling multicasting and broadcasting to be easily implemented.

When the data generating sources are arranged on a line, data collection can be achieved economically.

Several tens of terminals can be accommodated simply by laying one or two optical fibers.

A high-reliability system is achieved, wherein fault self-recovery is possible and wherein faults can be self-detected.

Furthermore, since the ATM technique is used, compatibility with ATM exchanges is high, and this can therefore be used as the line concentrator system of an ATM exchange. Also, multi-media information such as video, audio and data can be collected in integrated manner.

BEST MODE FOR CARRYING OUT THE INVENTION

A communication system constituted by ATM switches arranged in distributed fashion according to the present invention is described in detail below with reference to the drawings.

Figure 1:
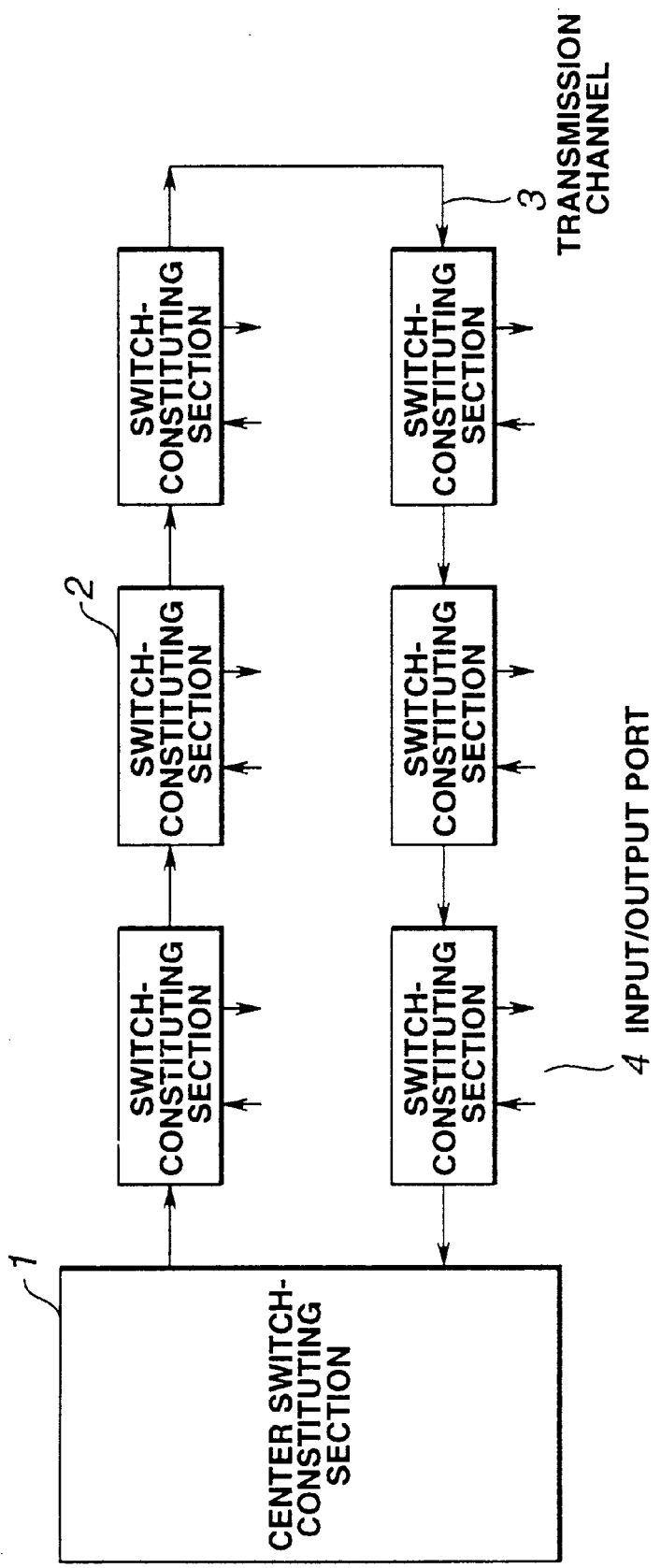
FIG. 1 is a block diagram illustrating the layout of a single-layer system according to an embodiment of the present invention.

FIG. 1 is a block diagram showing the layout of a single-layer system constituting the basic system according to the present invention. In this Figure, 1 is a center switch-constituting section that performs overall management of switching. 2 are switch-constituting sections arranged in dispersed fashion whereby signals sent from upstream flow downstream through a transmission channel 3 and that perform exchange of information with terminals through input/output ports 4. Mutual communication between switch-constituting sections 2 is intra-switch communication, so exchange of data is performed using the internal format. Center switch-constituting section 1 corresponds to the center device in the claims, switch-constituting sections 2 correspond to node devices in the claims, and transmission channel 3 corresponds to communication channel means in the claims. As will be described later, functioning as in a single ATM switch is realized by center switch-constituting section 1, switch-constituting sections 2 and transmission channel 3.

Replacement of VPI/VCI is not performed in switch-constituting sections 2. Since the mutual distance between switch-constituting sections 2 may be as much as a few km, for mutual communication between switch-constituting sections 2, serial transmission using an optical transceiver is performed.

In this way, transmission channel 3 from center switch-constituting section 1 is connected to the first switch-constituting section 2 and transmission channel 3 going out from the first switch-constituting section 2 is connected to the next switch-constituting section 2. In this way, after passing successively through the switch-constituting sections 2, transmission channel 3 finally returns to center switch-constituting section 1, thus constituting a loop. In addition, signal channels to terminals are provided from switch-constituting sections 2, separately from transmission channel 3.

In order to explain the actual operation of this system, an example will be described in which an operation of monitoring a point on a motorway is performed by ITV and an operation of measuring wind speed by an anemometer and displaying this wind speed on an electro-optical notice board are performed.

Figure 2:
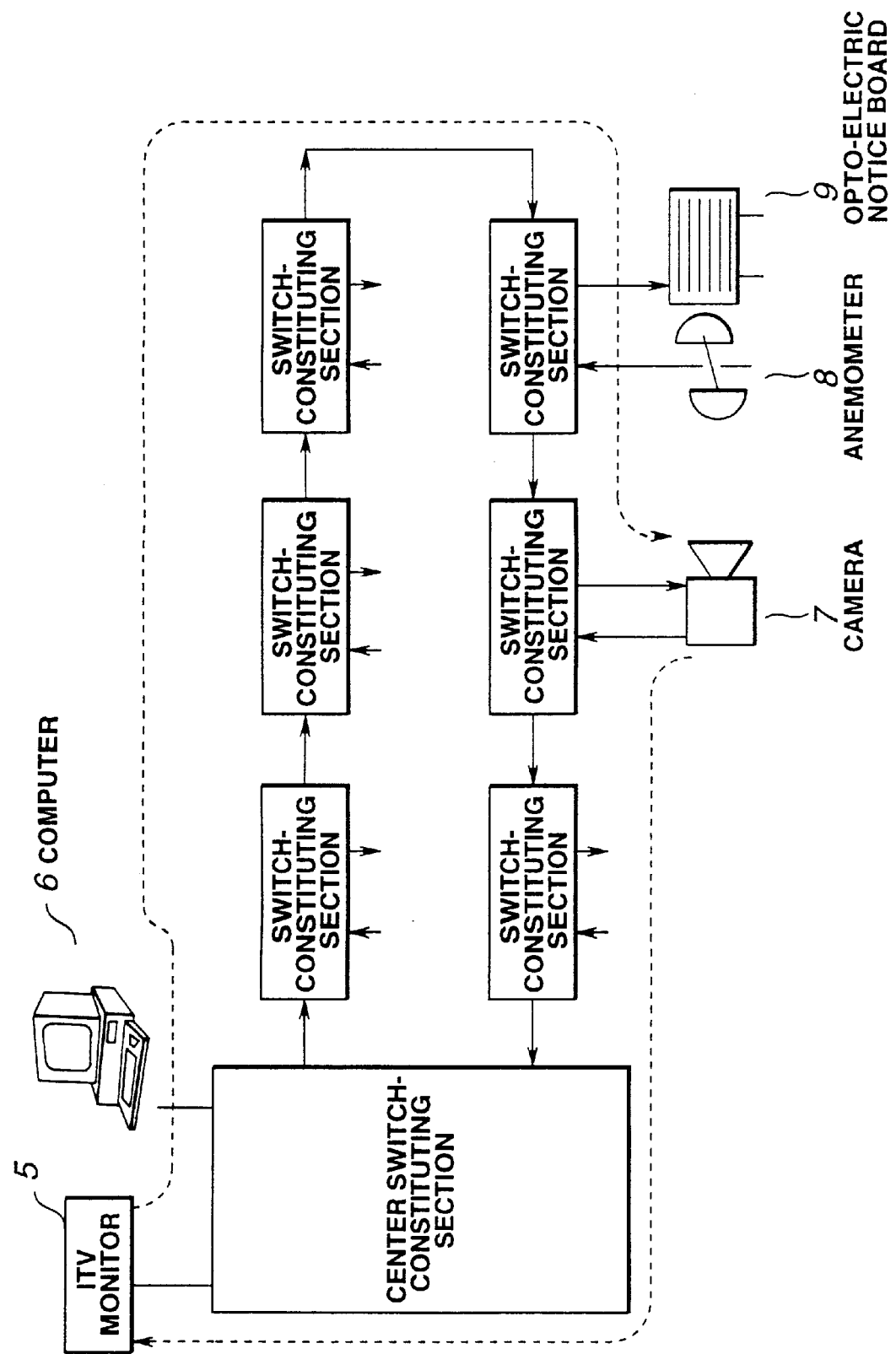
FIG. 2 is a view showing the layout of a road monitoring system employing the embodiment shown in FIG. 1.

FIG. 2 shows a road monitoring system in which this example is put into effect.

Video from ITV camera 7 is put on transmission channel 3 by a switch-constituting section 2 and is conveyed, through center switch-constituting section 1, to an ITV monitor 5 connected to center switch-constituting section 1. When a camera direction instruction signal and/or zoom signal etc. are input by means of an input device, not shown, attached to ITV monitor 5, these signals are conveyed to ITV camera 7 from ITV monitor 5 by a path, not shown.

Likewise, in the case of the measurement data of an anemometer 8, this is put on transmission channel 3 by switch-constituting section 2 and is thence conveyed through center switch-constituting section 1 to a computer 6 connected to center switch-constituting section 1 and, after being processed by computer 6, is conveyed by a route identical to that of the instruction signal to ITV camera 7, to an electro-optic notice board, where the wind speed is displayed.

Thus, with such a road monitoring system, transmission of video obtained by ITV camera 7 is frequently performed and it is anticipated that in the future also multimedia transmission will increase even more; the significance of introducing an ATM switch function according to the present invention into a road monitoring system is therefore great.

Figure 3:
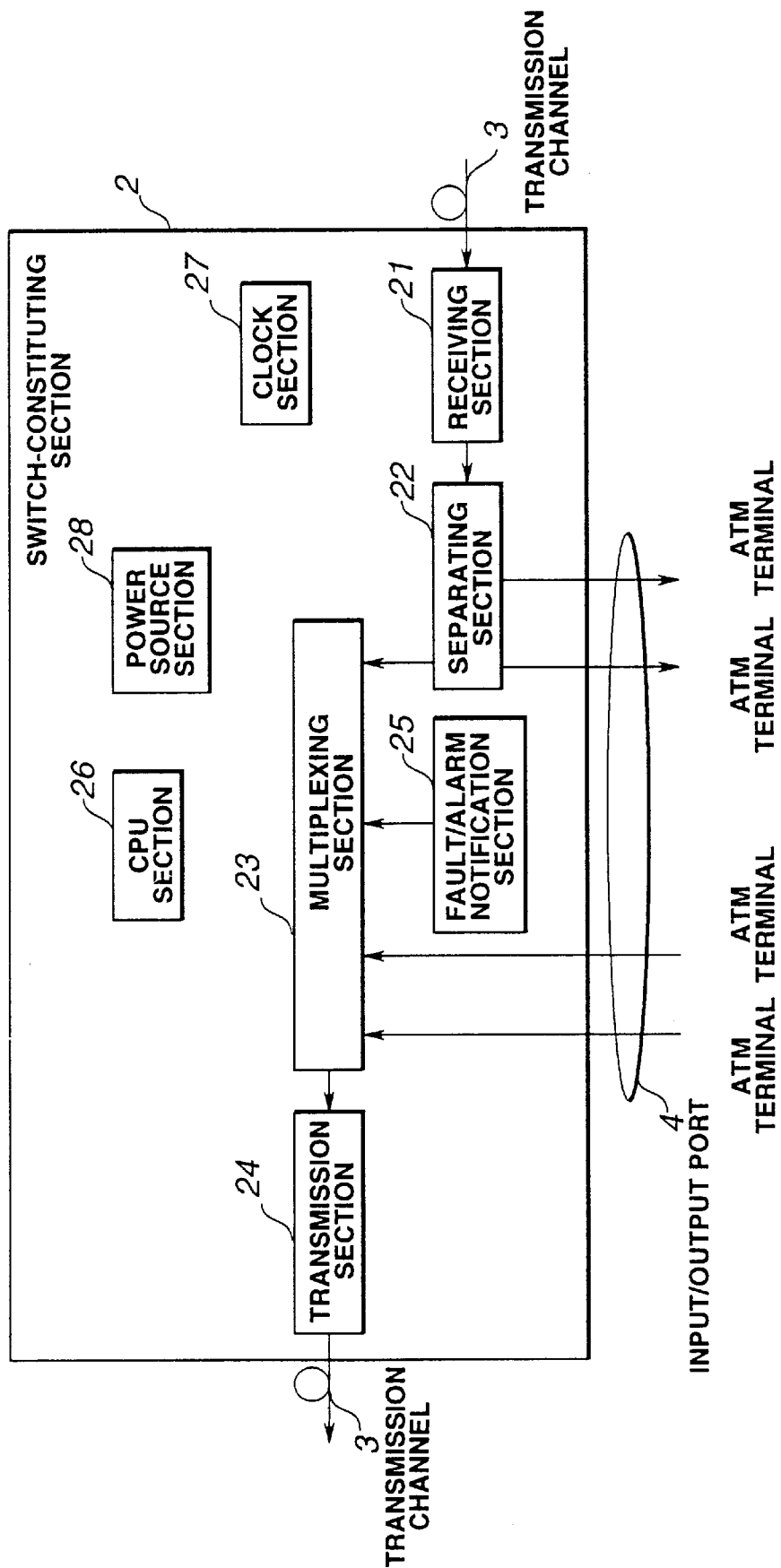
FIG. 3 is a block diagram of a switch-constituting section in the embodiment shown in FIG. 1.

FIG. 3 shows an example of the detailed layout of a switch-constituting section 2 of the basic system shown in FIG. 1.

In receiving section 21, multiplexing modules such as OC-3 or STM-1 are terminated and cells conveyed by the payload of the modules are extracted. Separating section 22 hands over cells addressed to this switch-constituting section 2 to a terminal, not shown.

In contrast, cells sent to multiplexing section 23 are mixed without overlapping cells output from the terminal and are then conveyed by the payload of a multiplexing module such as OC-3 or ST-1 via transmission section 24 and are then sent to the next-stage switch-constituting section 2.

As the constituent elements of switch-constituting section 2, apart from receiving section 21, separating section 22, multiplexing section 23, and transmission section 24 described above, there are a CPU unit 26 that performs the processing at various locations of switch-constituting part 2, clock section 27, power source section 28 and fault alarm notification section 25.

When CPU section 26 detects that a fault has occurred so that the signal from upstream has been interrupted, by free running of clock section 27, it puts the fault information from fault alarm notification section 25 into the form of cells which are then transmitted downstream through multiplexing section 23. In this case, center switch-constituting section 1 that has received this can infer the location of the fault by either putting information specific to this switch-constituting section in the cells or by employing a code specific to this switch-constituting section in the VPI/VCI that is used.

Figure 4:
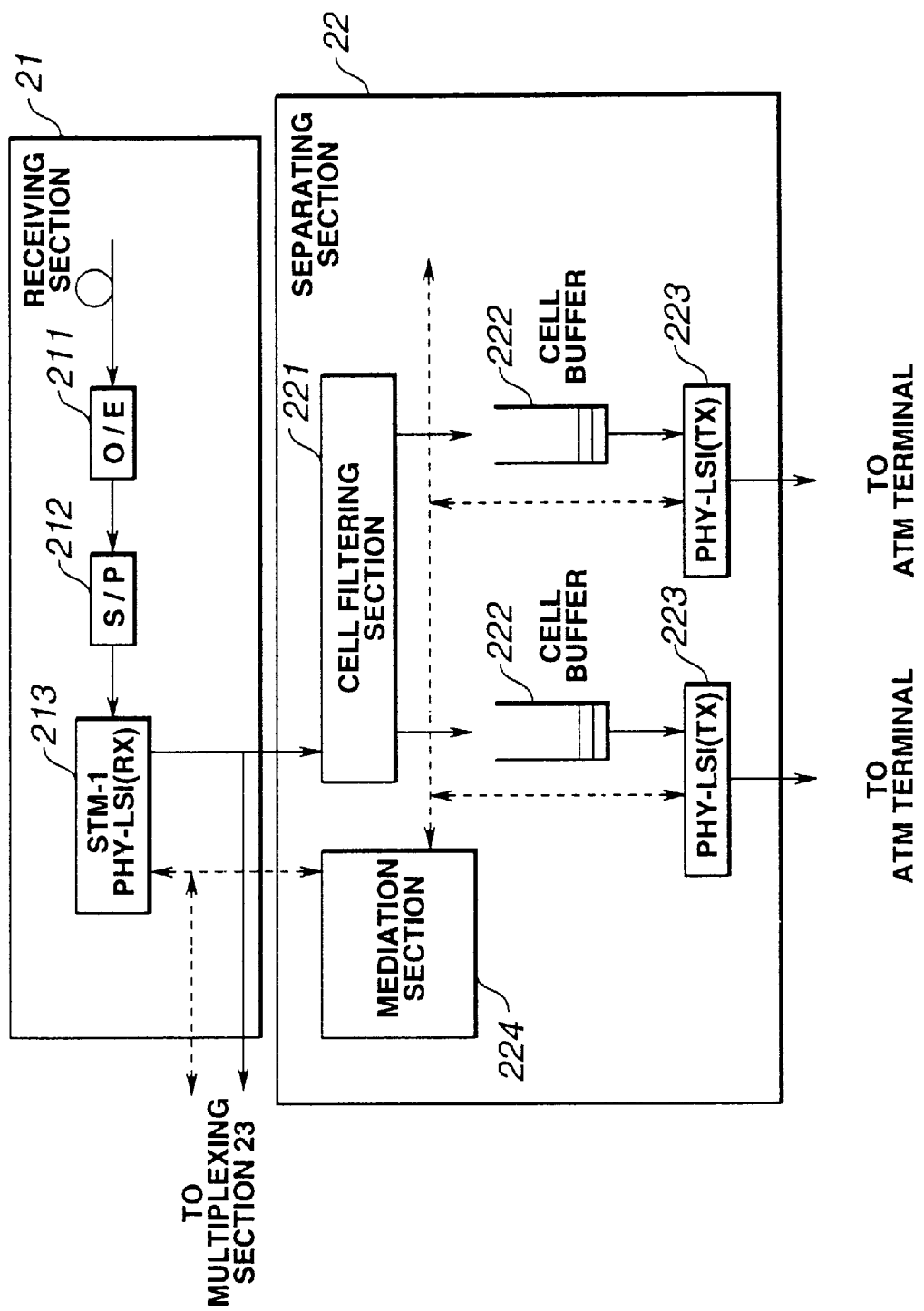
FIG. 4 is a block diagram of a receiving section and separating section of a switch-constituting section shown in FIG. 3.

FIG. 4 shows the layout of receiving section 21 and separating section 22 of the basic system. An optical signal on an optical fibre is input to opto-electric conversion section (O/E) 211 of receiving section 21, where it is converted to an electrical signal, which is then converted to a parallel signal by serial/parallel conversion section (S/P) 212. The OC-3 or STM-1 signal is then terminated at RX section 213 and incoming cells nsmitted by the payload are extracted.

The cells extracted by RX section 213 are sent to separating section 22 of the basic system. The cells first of all enter cell filtering section 221 where cells destined for the switch-constituting section 2 in question are extracted and sen t to the terminal. An example algorithm used for this purpose is shown in FIG. 13.

Figure 13:
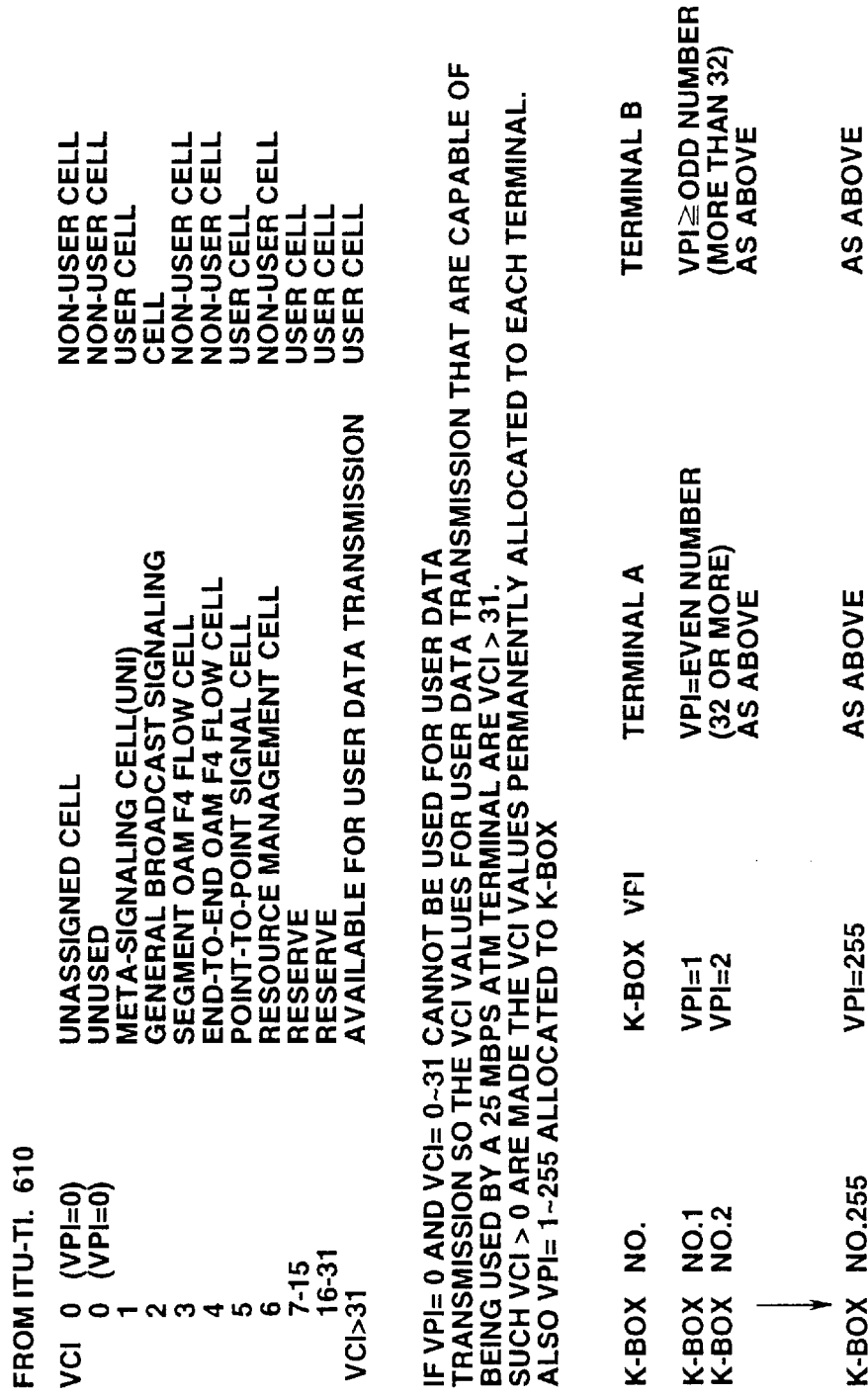
FIG. 13 is a view showing an example of a cell identifier algorithm.

In FIG. 13, cells wherein VPI and VCI are both 0 and cells wherein VPI is 1 or more while VCI has an identifier of 0~31 are employed for special purposes, or, because the identifier has already been reserved, identifiers which may be employed for user data transmission in respect of the ATM terminal may have VCI of 32 or more, VPI 1 or more, usually 1~255. Of these, the VPIs are allocated to respective switch-constituting sections 2 and VCIs of 32 or more are employed for the identification of terminals associated with respective switch-constituting sections 2. Where there are two terminals associated with a switch-constituting section 2, these may be distinguished by whether the VCI is odd or even. Also, specified bits of VCI or VPI may be employed as bits for multicasting.

On the other hand, cells extracted in RX section 213 of receiving section 21 are also sent to multiplexing section 23 in parallel with separating section 22.

Figure 5:
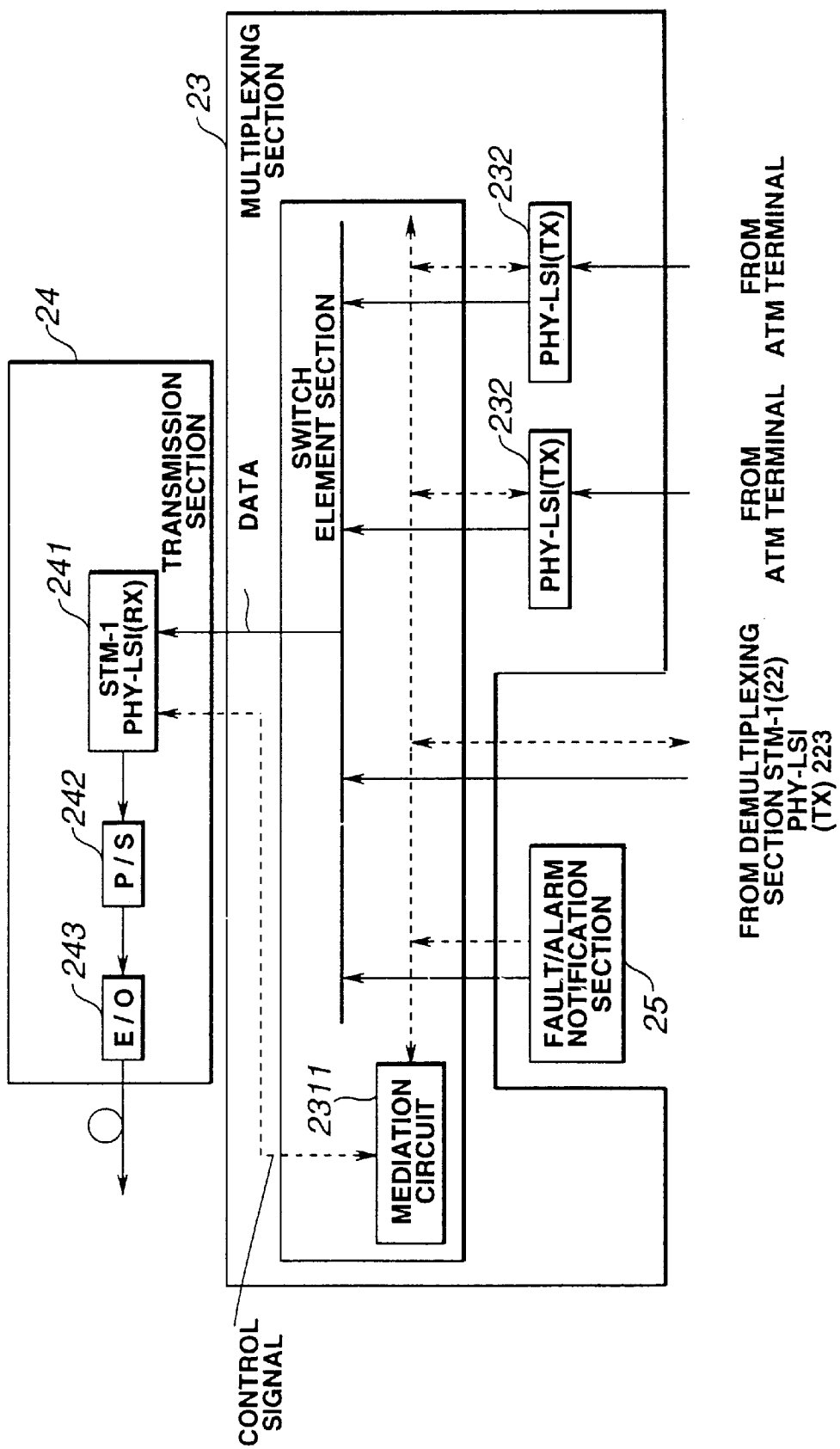
FIG. 5 is a block diagram of a multiplexing section and transmitting section of the switch-constituting section shown in FIG. 3.

FIG. 5 shows the layout of multiplexing section 23 and transmission section 24 of the basic system. Cells from separating section 22, the terminal and fault alarm notification section 25 are input to switch element section 231. Various types of construction could be adopted for switch element section 231 such as a common buffer type or cell routing type. Here, however, the explanation will be given in terms of a bus-type switch, as illustrated. A mediation circuit 2311 at the bus entrance performs cell traffic control and designates from which inputs cells may be output on to the bus, thereby preventing collisions of cells on the bus.

Fault alarm notification section 25 detects abnormality when the signal from upstream is interrupted and notifies center switch-constituting section 1 of the fact that an abnormality has occurred and the location of the abnormality by free running of the clock and output of a fault alarm signal.

The output of switch-constituting section 231 is sent to transmitting section 24 of the basic system. Transmission section 24 first of all puts the cells into the payload of an OC-3 or STM-1 frame in TX section 241; parallel/serial conversion section (P/S) 242 then effects conversion to a serial signal, which is then converted by electro-optical conversion section (E/O) 243 into an optical signal, which is sent to an optical cable.

Figure 6:
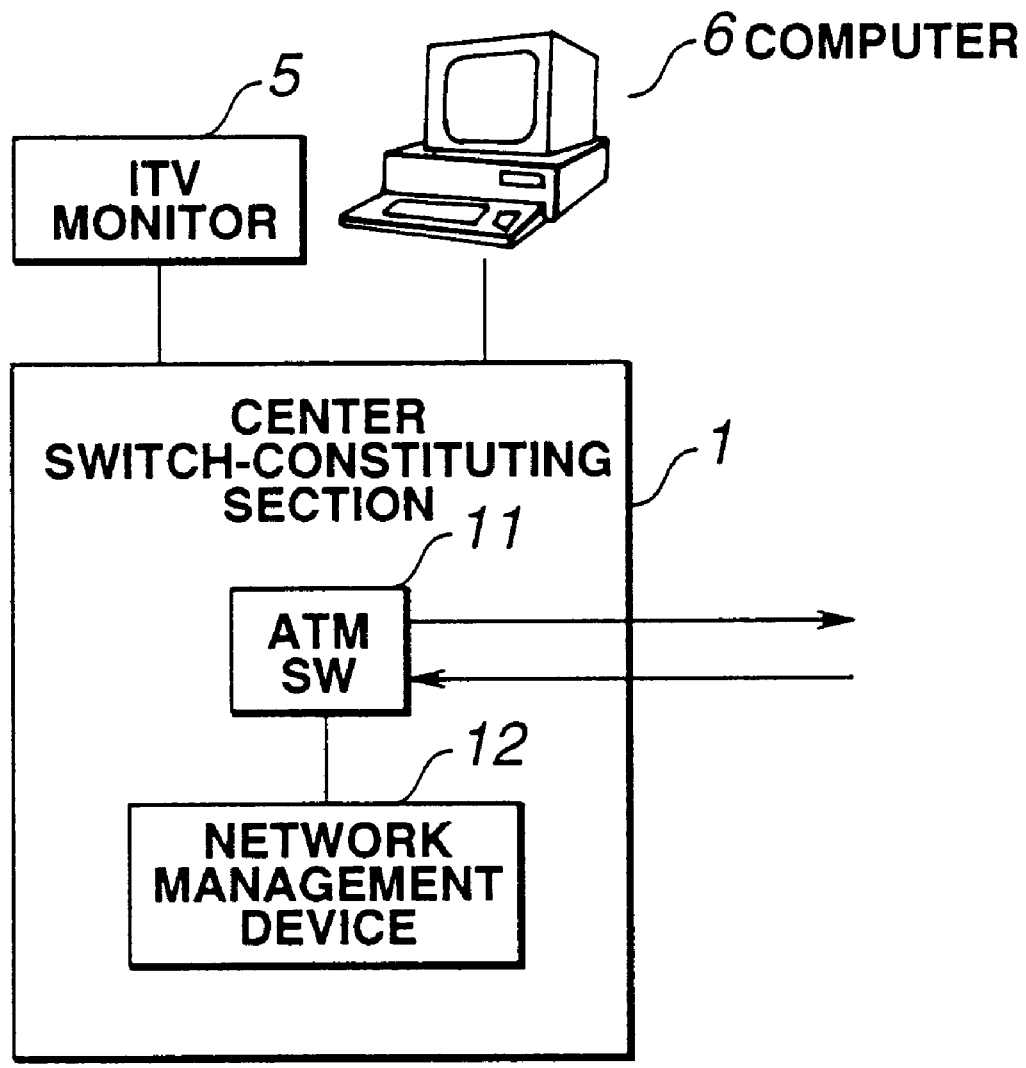
FIG. 6 is a block diagram of a center switch-constituting section in the embodiment shown in FIG. 1.

FIG. 6 shows the layout of a center switch-constituting section 1 of the basic system.

Center switch-constituting section 1 is constituted in this example by an ATM switch 11 and network management device 12. In FIG. 6, ITV monitor 5 and computer 6 are connected to ATM switch 11 but these are not essential. Cells sent from a terminal through a switch-constituting section 2 are sent to ITV monitor 5 and/or computer 6 via ATM switch 11. When a fault alarm signal from fault alarm notification section 25 is sent to network management device 12, processing for, for example, detection of the location of the fault is performed.

A description of the details of the fault location search operation of the basic system will now be given, including what has already been described. When fault alarm notification section 25 detects that a fault has occurred in a switch-constituting section 2, causing the signal from upstream to be interrupted, it sends a fault alarm signal downstream in the form of cells by allowing free running of clock section 27, from fault alarm notification section 25 through multiplexing section 23. These cells either carry information specific to this switch-constituting section in their payload or a code specific to this switch-constituting section is employed in the VPI/VCI that is used. A fault alarm signal from fault alarm notification section 25 is sent to network management device 12 where processing such as detection of the location of the fault is performed.

When a fault occurs, all the signals of switch-constituting sections 2 downstream of that location are interrupted, so they will commence the operation described above practically simultaneously and confusion will be generated. Consequently, transitionally, various fault alarm signals arrive at network management device 12. However, after a fixed time has lapsed, subsequently, a stable fault alarm signal will be received. The reason for this is that, taking for example a switch-constituting section 2 at some intermediate point, although it will at first commence sending a fault alarm signal by free running of its clock on interruption of the signal from upstream, after a certain time has e lapsed, since the switch-constituting section 2 upstream of itself is of course performing the same operation, there will be an incoming fault alarm signal from this. Consequently, the switch-constituting section 2 in question will discontinue the sending of a fault alarm signal from itself by stopping free running of its clock and will merely perform relaying of the fault alarm signal from upstream. When in this way the system has settled down to a steady condition, only the switch-constituting section 2 adjacent the location of fault will be performing free running of its clock and transmission of the fault alarm signal.

Figure 7:
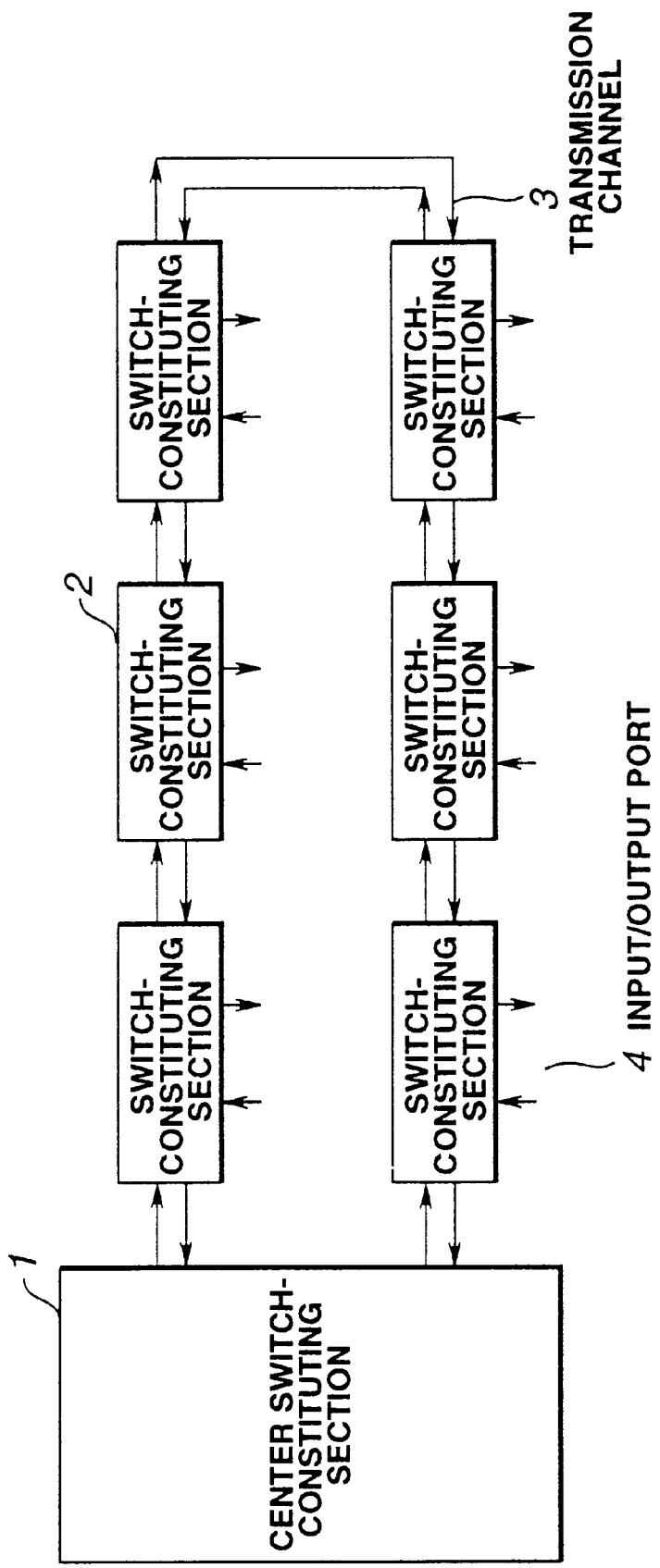
FIG. 7 is a block diagram showing the layout of a double system according to another embodiment of the present invention.

Next, a double system, which is an expansion system of the basic system will be described. FIG. 7 shows an example of the construction of such a double system.

Figure 8:
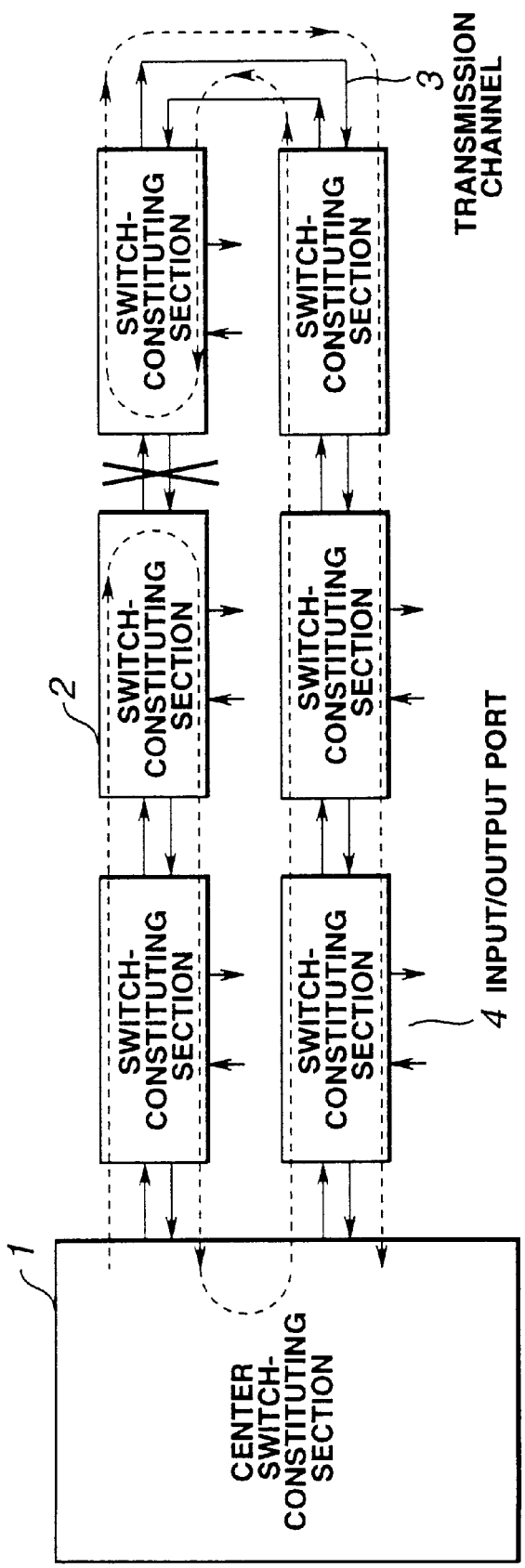
FIG. 8 is a diagram of loop-back on occurrence of a fault in the embodiment of FIG. 7.

The difference from the layout diagram of the basic system of FIG. 1 lies in that the transmission path is duplicated. Thanks to this duplication, if a fault occurs, as shown in FIG. 8, loop-back of the signal is performed upstream and downstream of the location of occurrence of the fault, so that function recovery can be performed automatically.

Figure 9:
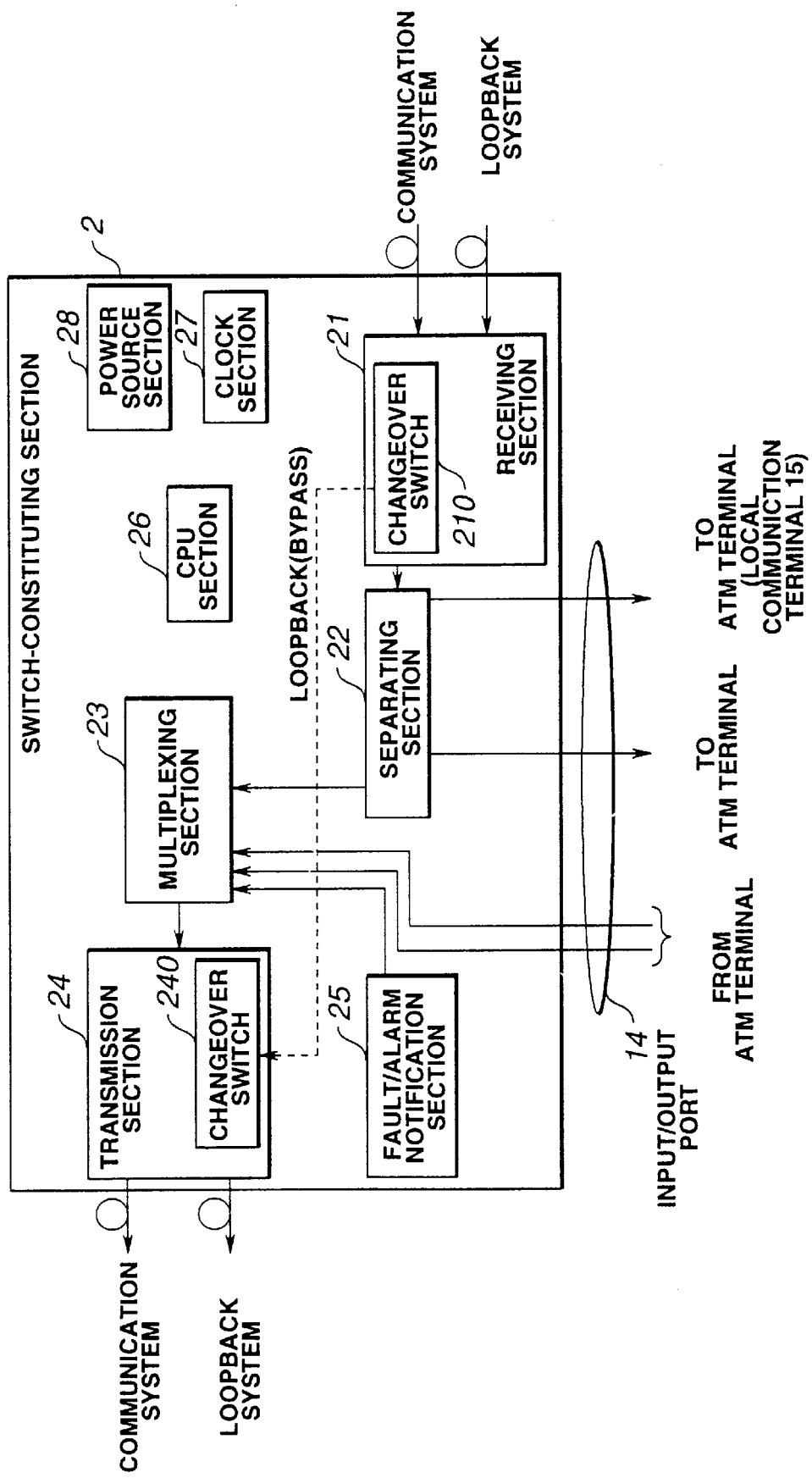
FIG. 9 is a block diagram of a switch-constituting section in the embodiment shown in FIG. 7.

FIG. 9 shows the layout of a switch-constituting section 2 in this system. Since its layout is similar to that of the basic system, only sections where there is a difference will be described.

Transmission path 3 is duplicated to provide two systems, namely, a communication system and a loopback system. As shown in FIG. 9, the communication system and loopback system signal are distinguished on the input side of separating section 22 and the output side of multiplexing section 23, and changeover switches 210, 240 for bypassing the loopback system signal are respectively provided in receiving section 21 and transmission section 24. The loopback system signal is thereby directly connected to changeover switch 24 without going through separating section 22 and multiplexing section 23. Cells from center switch-constituting section 1 destined for the terminal are sent through the communication system and dropped at the terminal. Likewise control is effected such that cells sent to center switch-constituting section 1 from a terminal are added to the communication system in multiplexing section 23 also, but are not added to the loopback system. In this way, under normal conditions, only the communication system is employed for communication; the loopback system operates, but does not perform transfer of outgoing or incoming data with a terminal; only test cells flow through it to confirm that it is functioning properly.

If in this condition abnormality is detected, this is communicated to the user and on-line repair is effected without adverse effect to the user.

If a fault occurs, loopback, as will be described, is performed so that functioning is recovered; however, even under these circumstances, exchange of data with the terminal is still performed by the communication system and, as shown in FIG. 8, the loopback system merely relays the signal from the fault location to the opposite side.

In the case of a switch-constituting section 2 in which loopback is not performed, cells received from the communication system are sent to the communication system and cells received from the loopback system may be sent to the loopback system.

Also, in the case of a switch-constituting section 2 in which loopback is performed, cells received from the communication system may be sent to the loopback system and the cells received from the loopback system may be sent to the communication system. Also, fault alarm notification section 25 is unnecessary.

Figure 10:
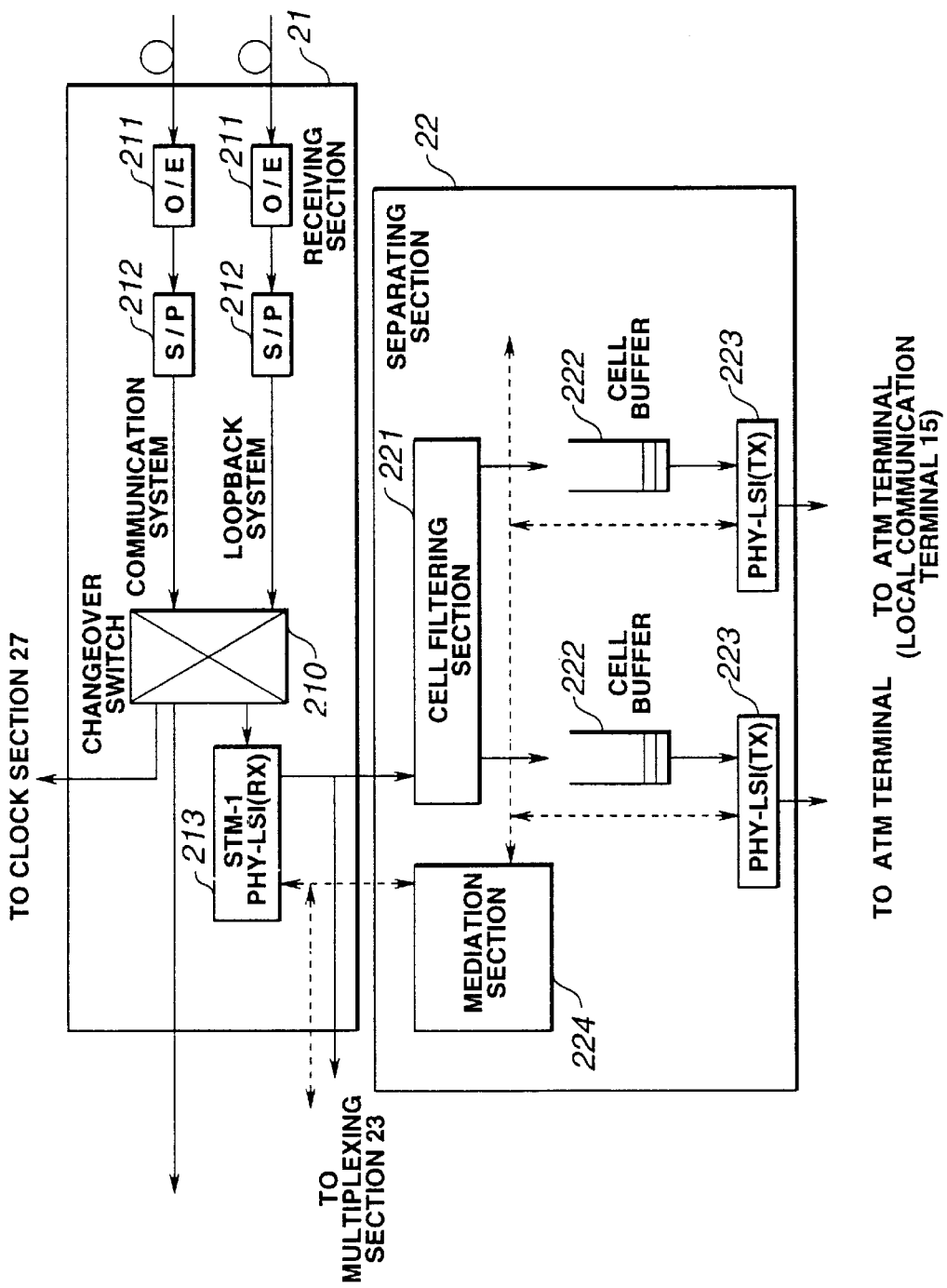
FIG. 10 is a block diagram of a receiving section and separating section of the switch-constituting section shown in FIG. 7.

FIG. 10 shows the layout of receiving section 21 and separating section 22 of the expanded system. These sections are similar in construction to receiving section 21 and separating section 22 of the basic system of FIG. 4, so only points of difference will be described.

Opto-electric conversion section 211 and serial/parallel conversion section 212 of receiving section 21 are duplicated by respective provision in the communication system and loopback system. A changeover switch 210 is provided that bypasses the loopback system signal, on the input side of separating section 22. The signal of the loopback system is not input to cell filtering section 221 but is directly sent to changeover switch 240 (see FIG. 11) of transmission section 24 (see FIG. 11). Parts other than these are the same in construction as receiving section 21 and separating section 22 of the basic system shown in FIG. 4.

Figure 11:
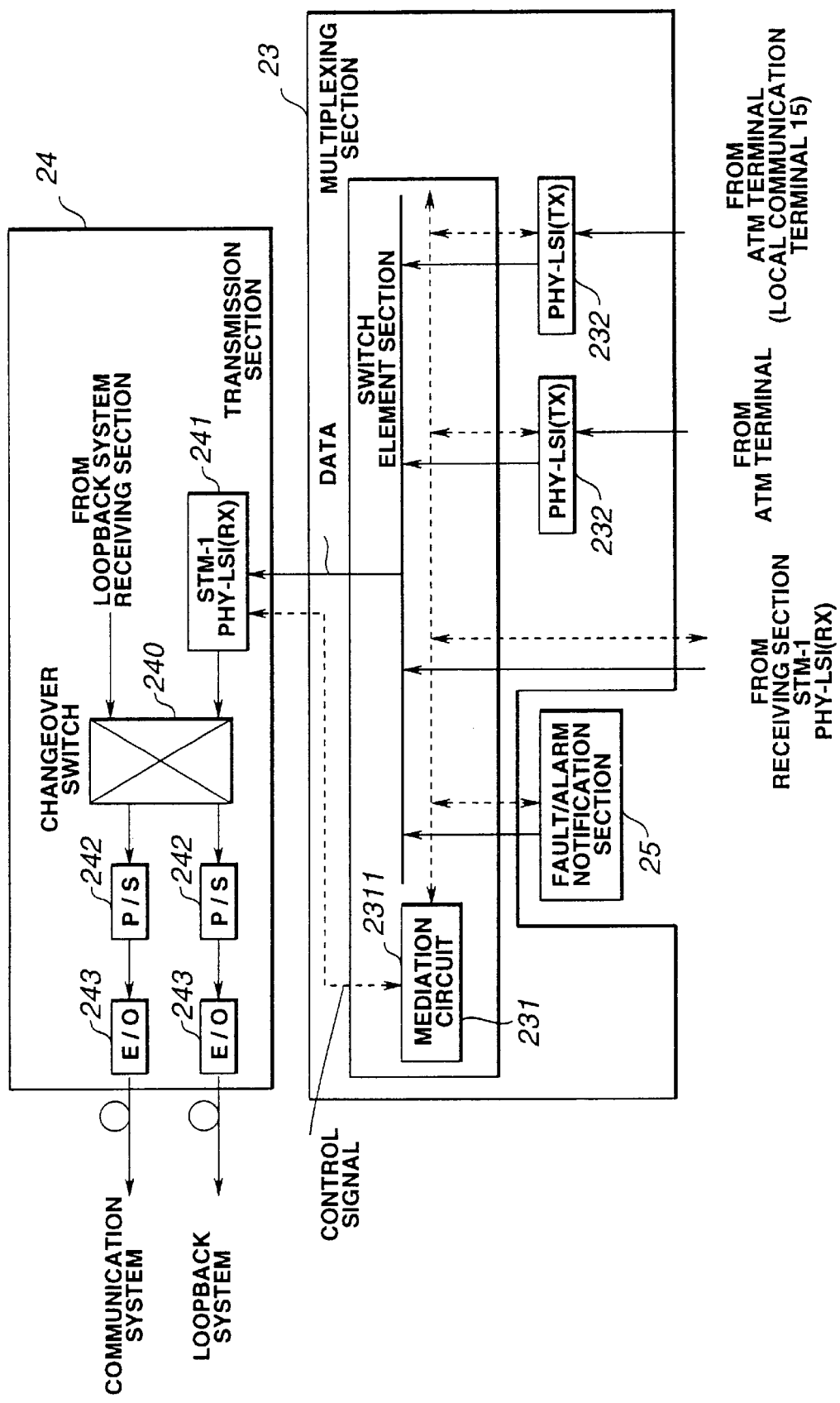
FIG. 11 is a block diagram of a multiplexing section and transmitting section of the switch-constituting section shown in FIG. 7.

FIG. 11 shows the layout of multiplexing section 23 and transmission section 24 of the expanded system. This section is similar in construction to the multiplexing section 23 and transmission section 24 of the basic system, so only points of difference will be described.

Parallel/serial conversion section 242 and electro-optic conversion section 243 of transmission section 24 are duplicated by respective provision in the communication system and loopback system. A changeover switch 240 is provided that bypasses the loopback system signal, on the output side of TX section 241 of transmission section 24.

Figure 12:
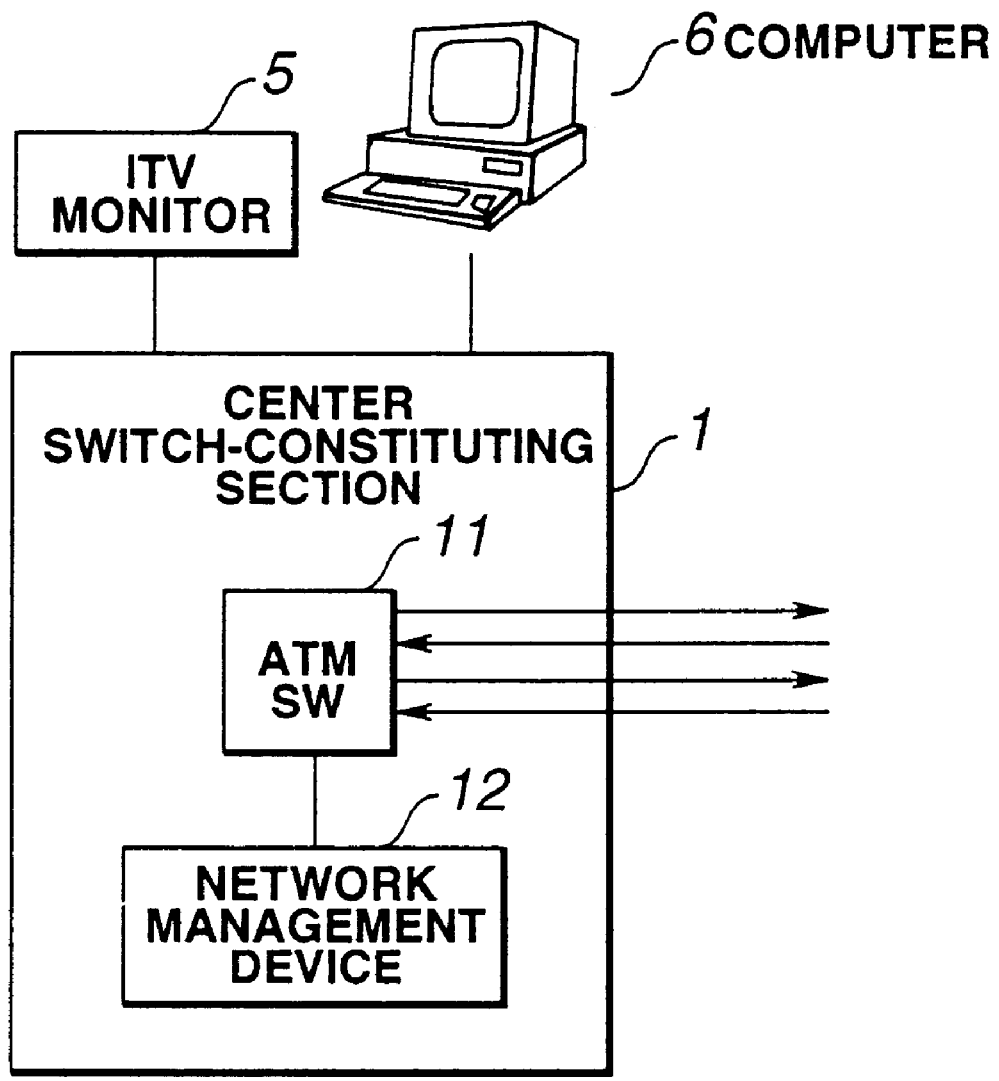
FIG. 12 is a block diagram of a center switch-constituting section in the embodiment shown in FIG. 7.

FIG. 12 shows the layout of center switch-constituting section 1 of the expanded system. Only parts which are different from center switch-constituting section 1 of the basic system shown in FIG. 6 will be particularly described.

The number of ports of ATM switch 11 has to be double that of the basic system. In addition, in loopback operation, a function is necessary to transfer cells of the loopback system that have been returned to ATM switch 11 to the communication system on the other side.

Next, fault recovery operation of the expanded system will be described following FIG. 8.

As described above, the expanded system has a communication system and a loopback system. Cells for fault detection purposes are periodically allowed to flow in these two systems in order to ensure a virtual communication channel for fault detection purposes. If it becomes impossible to receive these cells, this is evaluated as a fault, and operation to shift to loopback operation for recovery of function is commenced.

When a fault is detected, test cells are sent from center switch-constituting section 1 to the right-going transmission channel of the communication system; these are then looped back at changeover switch 240 (see FIG. 9) of switch-constituting section 2 adjacent center switch-constituting section 1, so that the test cells return to center switch-constituting section 1 by the left-going transmission channel of the loopback system. When the test cells return, this switch-constituting section 2 is evaluated to be normal. Test cells are then once more sent from center switch-constituting section 1 to the right-going transmission channel of the communication system. These pass through switch-constituting section 2 that was previously evaluated to be normal and are looped back at changeover switch 240 (see FIG. 9) of the switch-constituting section 2 which is one further on i.e. which is adjacent the switch-constituting section 2 which has now been evaluated to be normal. If these test cells return, the switch-constituting section 2 is evaluated to be normal. This operation is repeated so long as the adjacent switch-constituting sections 2 are normal, until a point of abnormality is reached; when the point of abnormality is reached, the looping back of the last normal section is maintained and the operation is terminated.

Next, an identical operation is performed in respect of the left-going transmission channel and this operation is stopped, holding the looping back of the last normal section; thus after the cells in the loopback system have returned to ATM switch 11 of center switch-constituting section 1 they are transferred to the communication system on the other side; thus function recovery isolating the faulty section is achieved.

As described above, the transmission channel 3 from center switch-constituting section 1 is connected to the first switch-constituting section 2 and the transmission channel 3 from the first switch-constituting section 2 is connected to the next switch-constituting section 2. In this way the transmission channel 3 passes successively through switch-constituting sections 2 until it finally returns to center switch-constituting section 1 thus constituting a loop. In addition signal channels to the terminals, separate from transmission channel 3, are provided from switch-constituting sections 2. Transmission channel 3 may be duplicated as right-going and left-going.

Cells from the terminal are mixed without overlapping with the cells from transmission channel 3 in switch element section 231 within switch-constituting section 2 and are output onto the right-going transmission channel or left-going transmission channel.

Mutual transmission between switch-constituting sections 2 is effected by serial transmission using transceivers but there is no need for connection between the terminals etc., being internal to the distributed-arrangement type switch, so the data format can be an internal format which need not conform to any standard, so circuitry which would be needed for conversion can be dispensed with, enabling costs to be lowered.

Furthermore, since ATM technology is employed, fine virtual communication channels for fault management can be set up. Specifically, communication for periodic monitoring is performed by setting up fine virtual communication channels for fault management from center switch-constituting section 1 on the right-going and left-going transmission channel 3. If a fault occurs, the occurrence of the drop-out fault can be detected with communication for monitoring purposes performed on either or both of the right-going and left-going channel. Loopback communication with center switch-constituting section 1 expands outwards on both the right-going and left-going channels, so the location of fault occurrence can be inferred as being outside the maximum expansion of the loopback communication. It is therefore unnecessary to made an inspection for fault detection purposes over a wide range.

Also, in the case where only a single transmission channel 3 is employed, it is arranged for switch-constituting sections downstream of a fault location to detect a fault by the non-arrival of signals, and, in response to this, to generate free running of their own clocks and to communicate with downstream by a fault signal carrying the number of their own individual switch-constituting section 2 on the fault path, discontinuing their own fault signal if a fault signal arrives from upstream. By this means, the location of the fault can be specified in that only the fault signal of the switch-constituting section 2 adjacent the fault location is left.

INDUSTRIAL APPLICABILITY

The present invention is useful in communication systems constituted by a data processing center, data generating sources and data receiving devices and a communication network linking these when the data generating sources and data receiving devices are arranged linearly.

What is claimed is:

1. A communication system comprising:
   a plurality of node devices arranged in remote-distributed fashion, each node device comprising a switch-constituting section of an ATM exchange for exchanging ATM cells;
   at least one local communication terminal connected to each of the node devices;
   communication channel means for connecting the plurality of node devices in series; and
   a center device to which a starting end and a terminal end of the communication channel means are connected, the center device having an ATM switching function and a node device management function;

wherein each node device multiplexes data from the local communication terminal connected to said node device with transmission data sent from the center device to the local communication terminal over the communication channel means in an internal format, wherein each node device extracts, from data transmitted through the communication channel means in an internal format, data for the at least one local communication terminal connected to said node device and sends the extracted data to the at least one local communication terminal, and whereby the internal format permits the exchange of ATM cells without replacement of a virtual channel and virtual path (VCI/VPI) of the ATM cells.

2. The communication system according to claim 1, wherein each node device comprises:

receiving means for receiving ATM cells from a downstream side of the communication channel means;

separation means for extracting, from the ATM cells received by the receiving means, ATM cells for the local communication terminal connected to said node device and outputs the extracted ATM cells to the at least one local communication terminal;

multiplexing means for multiplexing the ATM cells received by the receiving means with ATM cells from the at least one local communication terminal connected to said node device; and transmission means for transmitting the ATM cells multiplexed by the multiplexing means to an upstream side of the communication channel means.

3. The communication system according to claim 2, wherein the separation means comprises:

cell extracting means for extracting, from the ATM cells received by the receiving means, the ATM cells for the at least one local communication terminal connected to said node device;

cell buffer means for temporarily storing the ATM cells extracted by the cell extracting means; and cell transmitting means for transmitting the ATM cells stored in the cell buffer means to the local communication terminal connected to said node device.

4. The communication system according to claim 1, wherein each node device further comprises fault alarm notification means which detects a fault by detecting that a signal from a downstream side of the communication channel means is not received, generates fault alarm cells having an identification number of said node device and transmits the fault alarm cells to an upstream side of the communication channel means to notify the center device of the fault.

5. The communication system according to claim 1, wherein each node device further comprises fault alarm notification means which transmits cells having an identification number of said node device constantly to an upstream side of the communication channel means, detects a fault by detecting that the cells from a downstream side of the communication channel means are not received, generates fault alarm cells having an identification number of said node device and the transmits the fault alarm cells to an upstream side of the communication channel means to notify the center device of the fault.

6. The communication system according to claim 1, wherein the channel means comprises two independent circuits so as to recover the communication function on occurrence of a fault by loopback upstream and downstream of a fault location.

7. A communication system comprising:

a plurality of node devices arranged in remote-distributed fashion, each node device comprising a switch-constituting section of an ATM exchange for switching ATM cells;

at least one local communication terminal connected to each of the node devices;

communication channel means for connecting the plurality of node devices in series; and a center device, comprising a switch constituting section to which a starting end and a terminal end of the communication channel means are connected;

wherein each node device multiplexes data from the local communication terminal connected to said node device with transmission data sent from the center device to the local communication terminal over the communication channel means, wherein each node device extracts, from data transmitted through the communication channel means, data for the at least one local communication terminal connected to said node device and sends the extracted data to the at least one local communication terminal, and wherein said node device serially transfers data received from a downstream side of the communication channel means using a virtual channel and virtual path (VPI/VCI) to an upstream side of the communication channel means without changing the VPI/VCI.

8. A communication system comprising:

a plurality of node devices arranged in remote-distributed fashion, each node device comprising a switch-constituting section of an ATM exchange for switching ATM cells;

at least one local communication terminal connected to each of the node devices;

communication channel means for connecting the plurality of node devices in series;

a center device, comprising a switch constituting section to which a starting end and a terminal end of the communication channel means are connected; and multiplexing means comprising:

cell receiving means for receiving the ATM cells from the at least one local communication terminal connected to said node device in question; and switch element means for multiplexing, without overlapping, the ATM cells received by the receiving means from the downstream side of the communication channel means and the ATM cells received by the cell receiving means from the at least one local communication terminal connected to said node device, wherein the multiplexing means in each node device multiplexes data from the local communication terminal connected to said node device with transmission data sent from the center device to the local communication terminal over the communication channel means, wherein each node device extracts, from data transmitted through the communication channel means, data for the at least one local communication terminal connected to said node device and sends the extracted data to the at least one local communication terminal, and wherein said node device serially transfers data received from a downstream side of the communication channel means using a virtual channel and virtual path (VPI/VCI) to an upstream side of the communication channel means without changing the VPI/VCI.

9. A communication system comprising:

a plurality of node devices which serially transfer ATM cells received from a downstream side of a transmission line connecting the node devices in series and using a virtual path indicator and virtual channel indicator (VPI/VCI), to an upstream side of the transmission line without replacing the VPI/VCI;

at least one local communication terminal connected to each of the node devices; and a center device, comprising a switch-constituting section, to which a starting end and a terminal end of the transmission line are connected;

wherein each node device multiplexes data from the local communication terminal connected to said node device with transmission data sent from the center device to the local communication terminal over the transmission line, and wherein each node device extracts, from data transmitted through the transmission line, data for the at least one local communication terminal connected to said node device and sends the extracted data to the at least one local communication terminal.

* * * * *